(12) United States Patent
Grenda et al.

(10) Patent No.: US 9,096,774 B2
(45) Date of Patent: *Aug. 4, 2015

(54) HEAT-CURING POWDER-LACQUER COMPOSITIONS YIELDING A MATTE SURFACE AFTER CURING OF THE COATING, AS WELL AS A SIMPLE METHOD FOR PRODUCTION OF SAME

(71) Applicant: EVONIK DEGUSSA GmbH, Essen (DE)

(72) Inventors: Werner Grenda, Herne (DE); Emmanouil Spyrou, Schermbeck (DE); Thomas Weihrauch, Duelmen (DE); Christoph Lammers, Recklinghausen (DE); Holger Loesch, Herne (DE); Klaus Behrendt, Haltern am See (DE)

(73) Assignee: Evonik Degussa GmbH, Essen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/903,251

(22) Filed: May 28, 2013

(65) Prior Publication Data

US 2014/0316056 A1   Oct. 23, 2014

Related U.S. Application Data

(63) Continuation of application No. 12/723,045, filed on Mar. 12, 2010, now Pat. No. 8,476,376.

(30) Foreign Application Priority Data

Mar. 11, 2010   (DE) .......................... 10 2010 002 785

(51) Int. Cl.
| | | |
|---|---|---|
| C09D 167/00 | (2006.01) | |
| C08G 59/42 | (2006.01) | |
| C08G 59/46 | (2006.01) | |
| C08L 63/00 | (2006.01) | |
| C09D 5/03 | (2006.01) | |
| C09D 133/00 | (2006.01) | |
| C09D 163/00 | (2006.01) | |
| C09D 133/08 | (2006.01) | |
| C08K 5/20 | (2006.01) | |

(52) U.S. Cl.
CPC .......... *C09D 167/00* (2013.01); *C08G 59/4246* (2013.01); *C08G 59/46* (2013.01); *C08L 63/00* (2013.01); *C09D 5/032* (2013.01); *C09D 133/00* (2013.01); *C09D 133/08* (2013.01); *C09D 163/00* (2013.01); *C08K 5/20* (2013.01)

(58) Field of Classification Search
CPC .... C09D 133/00; C09D 133/08; C09D 5/032; C09D 163/00; C09D 167/00; C08G 59/46; C08G 59/4246; C08L 63/00; C08K 5/20
USPC ............. 428/481; 524/81, 401; 525/374, 384, 525/420, 425, 437, 934; 528/296, 298, 300, 528/301, 302, 307, 308, 308.6, 492
See application file for complete search history.

(56) References Cited

U.S. PATENT DOCUMENTS

| | | |
|---|---|---|
| 3,842,035 A | 10/1974 | Klaren |
| 4,801,680 A | 1/1989 | Geary et al. |
| 6,710,136 B2 | 3/2004 | Grenda et al. |
| 7,026,393 B2 | 4/2006 | Wenning et al. |
| 7,300,997 B2 | 11/2007 | Wenning et al. |
| 2004/0014855 A1 | 1/2004 | Wenning |
| 2004/0018374 A1 | 1/2004 | Wenning et al. |
| 2004/0110907 A1 | 6/2004 | Weiss et al. |
| 2004/0132924 A1 | 7/2004 | Weiss et al. |
| 2005/0119437 A1 | 6/2005 | Wenning et al. |
| 2007/0282089 A1 | 12/2007 | Spyrou |
| 2008/0255272 A1 | 10/2008 | Weiss et al. |
| 2011/0224459 A1 | 9/2011 | Grenda et al. |
| 2011/0288202 A1 | 11/2011 | Grenda et al. |

FOREIGN PATENT DOCUMENTS

KR   10-2009-0111720   10/2009

OTHER PUBLICATIONS

Translation of Jung, H.R., et al., Journal of Korean Industrial Engineering Chemistry, pp. 1-16 (Apr. 2009).
Fink, et al., "Optimising the matting of powder coatings", Applied Chemistry, Creative Solutions, Presented at Powder Coatings—Europe/Nuernberg, Germany, 8 pages (Jan. 2002).
Ronald Guida, Powder Coating 2002, Formulator's Technology Conference, A Novel Approach to Produce Reduced Gloss β-Hydroxyl Alkylamide Powder Coatings, pp. 167-182 (2002).
Palanisamy, et al., Progress in Organic Coatings., vol. 56, pp. 297-303 (2006).
Jung, et al., Journal of Korean Industruial Engineering Chemistry, vol. 20, pp. 195-200 (2009).

*Primary Examiner* — Robert Jones, Jr.
(74) *Attorney, Agent, or Firm* — Oblon, McClelland, Maier & Neustadt, L.L.P.

(57) ABSTRACT

The invention relates to heat-curing powder-lacquer compositions exhibiting a matte surface after curing of the coating, as well as to a simple method for production of the same.

26 Claims, No Drawings

HEAT-CURING POWDER-LACQUER COMPOSITIONS YIELDING A MATTE SURFACE AFTER CURING OF THE COATING, AS WELL AS A SIMPLE METHOD FOR PRODUCTION OF SAME

CROSS-REFERENCE TO RELATED APPLICATION

This application is a continuation of U.S. application Ser. No. 12/723,045 filed Mar. 12, 2010, which is incorporated herein by reference. This application also claims the benefit of DE 102010002785.5 filed Mar. 11, 2010.

The invention relates to heat-curing powder-lacquer compositions exhibiting a matte surface after curing of the coating, as well as to a simple method for production of same.

Thermally curable powder lacquers do not release any organic solvents during application and therefore have clearly ecological advantages compared with liquid lacquers. Thermal cross-linking takes place via polyaddition or polycondensation reactions between the functional groups contained in the binders. Typical binder systems are epoxy resins with curing agents based on amines, amidines, acids, anhydrides; carboxyl polyesters or polyacrylates with curing agents based on epoxides; hydroxyl polyesters or polyacrylates with cross-linking agents on the basis of blocked isocyanates; epoxy-group-containing polyacrylates with dicarboxylic acids as cross-linking agents, carboxyl polyesters or polyacrylates with cross-linking agents on the basis of β-hydroxyalkyla-mides, etc. The various binder systems differ not only in lacquer-specific properties but also and especially in resistance to outdoor weathering. The pure binder systems usually lead to high-gloss surfaces, with a specular gloss of >80 scale divisions (DIN 67530/ISO 2813, angle of incidence 60°), when they are processed in a one-shot method with only one reaction partner, such as cross-linking agent and resin, and allowed to cure.

Coating systems imparting a uniformly level and matte surface to a substrate command particular interest. The reason is of predominantly practical nature. Glossy surfaces require much more intensive cleaning than do matte surfaces. Furthermore, safety considerations may make it desirable to avoid highly reflective surfaces. Broad sectors of the powder-lacquer industry, such as the architecture, automobile and metal-furniture sectors, are seeing a rising demand for matte (10-30 units) and semi-matte (30-50 units) surfaces, measured as reflectometer values according to DIN 67530/ISO 2813 at an angle of incidence of 60°.

The simplest principle by which a matte surface can be obtained is to admix fillers such as chalk, finely divided silicon dioxide or barium sulfate with the powder lacquer in lower or higher proportions, depending on the desired matte effect. However, such additives lead to deterioration of the lacquer-specific properties, such as adhesion, flexibility, impact resistance and chemical resistance.

The addition of substances incompatible with the lacquer, such as waxes or cellulose derivatives, indeed achieves distinct matting. However, slight changes during extrusion lead to fluctuations in surface gloss and to "fade out" in dark color tones. Reproducibility of the matte effect is not guaranteed.

EP 0698645 describes the creation of matte powder coatings by means of dry mixing (dry blend) of at least two separately manufactured hydroxyalkylamide powder lacquers.

U.S. Pat. No. 3,842,035 therefore proposes to produce matte powder-lacquer coatings by dry blending of finished powder lacquers having sufficiently different reactivities, or in other words powder lacquers having very short and very long gelling times. The binders used are acrylic resins, alkyd resins and preferably epoxy resins.

WO A 89/06674 describes the production of surfaces having a satin gloss or matte appearance by dry blending, or in other words physically mixing finished powder lacquers composed of different binder systems.

DE 2324696 proposes a method for producing matte coatings by use of a special curing agent capable of reacting with epoxy groups, this agent being the salt of cyclic amidines with particular polycarboxylic acids. According to this method, cross-linking of the powder lacquer takes place with different reactivities at various temperatures, whereby microstructures having a matte surface are formed at the surface. The use of this method is restricted to epoxy and carboxyl polyester/epoxy powder lacquers, however, and so coatings having adequate weathering resistance cannot be produced by this method.

EP 366608 also proposes a method for producing powder lacquers having matte surfaces. It relates to powder lacquers based on epoxy resins or epoxy compounds, such as triglycidyl isocyanurate (TGIC) with carboxyl-terminated polyester resins and mixtures of di-, tri- or tetrakis-(β-carboxyethyl) cyclohexanones or cyclopentanones. The matte effect in this case is attributed to the different reactivities between the aliphatic carboxylate groups of the cross-linking agent and the aromatic carboxylate groups of the carboxyl-terminated polyester resin.

Another patent, DE 3232463, describes powder lacquers having matte surfaces and obtained by coextrusion of hydroxyl-terminated polyester resins, epoxy compounds such as TGIC and special reversibly blocked polyisocyanates having free carboxylate groups.

U.S. Pat. No. 4,801,680 (EP 322834) describes a thermally curable powder lacquer comprising a particulate mixture of a carboxylate-group-containing polyester and a β-hydroxyalkylamide. After application on a substrate, this powder lacquer leads to glossy lacquer surfaces. According to Example 2 of U.S. Pat. No. 4,801,680, the lacquer surfaces obtained do not exhibit any impairment of the lacquer surface after having been subjected to an accelerated weathering test using UV irradiation.

EP 520429 describes a resin composition of polyesters having different hydroxyl numbers. The described resin composition necessarily comprises a substantially ungelled polyester A, a substantially ungelled polyester B, tetramethoxymethylglycoluril as curing agent and an organic sulfonic acid as catalyst.

Numerous further publications discuss the possibilities for matting of hydroxyalkylamide powder lacquers. Examples are R. Franiau, "Advances in β-Hydroxyalkylamide Crosslinking Chemistry" ECJ, (2002) 10, pp. 409 ff.; D. Fink, U. Kubilius, "Optimising the Matting of Powder Coatings", Powder Coatings Europe 2002 and R. Guida, "A Novel Approach to Produce Reduced Gloss β-Hydroxyl Alkylamide Powder Coatings" Powder Coating 2002 PCI Conference; D. Beccaria et al. "Modeling Gloss Control in Polyester/β-Hydroxyalkylamide Powder Coatings Based on SPM Structure-Property Relationship" Waterborne, High-Solids and Powder Coatings Symposium, Feb. 26-28, 2003, New Orleans, La., USA.

For matte and semi-matte (<50 gloss units) powder-lacquer compositions containing hydroxyalkyamides, therefore, dry blends represent the state of the art. In other words, two hydroxyalkylamide powder lacquers based on β-hydroxyalkylamides plus resins (polymers) having different acid numbers must be separately produced then added as a dry mixture to the grinding process. This imposes considerable extra time and effort and, if any binder component suffers from deviations, leads to gloss deviations, which require considerable additional time and effort to correct. Furthermore, these dry mixtures separate even in the possession of the end customer, with a resulting shift in gloss, if the powder lacquer is scheduled to be recycled in the usual way.

The object of the invention was to find a heat-curing powder-lacquer composition exhibiting a matte surface after curing of the coating, as well as to find a simple method for production of same.

This object is achieved by the new inventive β-hydroxyalkylamides as cross-linking agents (curing agents) as well as by the inventive method.

Subject matter of the invention is a powder-lacquer composition substantially containing A) at least one carboxylate-group-containing polymer having an acid number of 5 to 350 mg KOH/g and a glass transition temperature $T_g$ higher than 40° C., and B) at least one β-hydroxyalkylamide having two or three or four β-hydroxyalkylamide groups per molecule of formula I

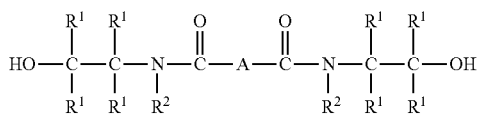

where
$R^1$, $R^2$: independently of one another denote the same or different radicals, selected from alkyl radicals, cycloalkyl radicals, aryl radicals, aralkyl radicals or alkenyl radicals having 1-24 carbon atoms, wherein the radicals may also contain heteroatoms and/or functional groups and wherein $R^1$ may also be hydrogen,
and wherein $R^2$ may also be

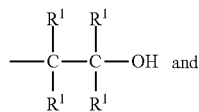

A:

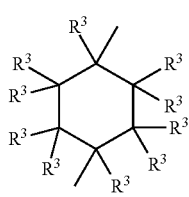

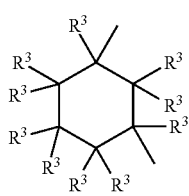

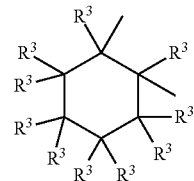

where $R^3$: independently of one another denote the same or different radicals, selected from hydrogen, alkyl radicals, cycloalkyl radicals, aryl radicals, aralkyl radicals or alkenyl radicals having 1-24 carbon atoms, wherein the radicals may also contain heteroatoms and/or functional groups and wherein two or more $R^3$ substituents may be linked to one another to form rings;
wherein the β-hydroxyalkylamides exist in solid form below 150° C.;

C) optional processing aids and/or additives;
wherein the ratio of β-hydroxyalkyamide groups to the carboxylate groups ranges between 0.5:1 and 1.5:1.

Surprisingly, it has been found that, by the use of the new inventive β-hydroxyalkylamides according to formula I as cross-linking agents, it is possible to obtain coatings having matte (10-30 units) and semi-matte (30-50 units) surfaces, measured as reflectometer values according to DIN 67530/ISO 2813 at an angle of incidence of 60°.

Surprisingly, it has been found that, by means of the inventive method in a one-shot working cycle, or in other words by coextrusion of all components, it is possible to obtain the inventive powder-lacquer composition on the basis of carboxylate-group-containing polymers and inventive β-hydroxyalkylamides as cross-linking agents.

Within the scope of this invention, the terms cross-linking agent and curing agent are used synonymously.

There is no need to use, as cross-linking agent, a complex dry mixture (dry blend) of at least two powder lacquers having different reactivities and based on β-hydroxyalkylamides. Furthermore, there is also no need for a polyester mixture or a polyacrylate mixture of at least two resins having different reactivities.

As reaction partners for the β-hydroxyalkylamide compounds used according to the invention for the production of the powder-lacquer composition there can be considered carboxylate-group-containing polymers A). Polymerizates, polycondensates and polyaddition compounds may be used as polymers. In principle, it is possible to use any polymer containing at least two carboxylate groups and having a glass transition temperature $T_g$ above 40° C. Suitable carboxylate-group-containing polymers for the inventive powder lacquers are those having acid numbers of 5-350 mg KOH/g, preferably 15-150 mg KOH/g, and OH numbers<15 mg KOH/g. Preferably these polymers have at least two terminal carboxylate groups.

Within the scope of the invention, carboxylate-group-containing polyesters and/or polyacrylates are particularly preferred.

The carboxylate-group-containing polyesters A) preferably comprise polyester polycarboxylic acids produced from polyols and polycarboxylic acids or derivatives thereof. The glass transition temperature $T_g$ of these acid polyesters ranges from 40 to 80° C., more preferably 40 to 70° C., their acid number varies from 5 to 250 mg KOH/g, preferably from 10 to 150 mg KOH/g, more preferably from 12 to 120 mg KOH/g. The OH numbers are smaller than 15 mg KOH/g. They have an average molecular weight $M_w$ of 1,000 to 10,000 g/mol, preferably 1,500 to 9,000 g/mol, particularly preferably 2,000 to 8,000 g/mol.

The carboxylate-group-containing polyesters to be used according to the invention may be produced by using polycarboxylic acids, such as oxalic, succinic, adipic, 2,2,4(2,4,4)-trimethyladipic, azelaic, sebacic, decanedicarboxylic, dodecanedicarboxylic, fumaric, phthalic, isophthalic, terephthalic, trimellitic, pyromellitic acids. For the acid polyesters, the following polyols, for example, are used: ethylene glycol, 1,2- and 1,3-propanediol, 1,2-, 1,3-, 1,4- and 2,3-butanediol, 1,5-pentanediol, 3-methyl-1,5-pentanediol, neopentylglycol, 1,12-dodecanediol, 2,2,4(2,4,4)-trimethyl-1,6-hexanediol, trimethylolpropane, glycerol, pentaerythritol, 1,4-bishydroxymethylcyclohexane, cyclohexane-1,4-diol, diethylene glycol, triethylene glycol as well as dipropylene glycol. Obviously it is also possible to react hydroxyl-group-containing polyesters produced from polycarboxylic acids and polyols by known methods with polycarboxylic acids and/or polycarboxylic acid anhydrides to obtain the polyester polycarboxylic acids.

The carboxylate-group-containing polyester resins are produced in the known way by esterification or transesterification of dihydric and/or multihydric linear or branched, aliphatic or cycloaliphatic polyols with multibasic, preferably dibasic or multibasic aliphatic, cycloaliphatic or aromatic carboxylic acids or their anhydrides or their esters in the presence of an esterification or transesterification catalyst at temperatures up to approximately 250° C., with reduced pressure near the end.

Preferred polyols are 2,2-dimethyl-1,3-propanediol (neopentyl glycol), ethylene glycol, 1,4-butanediol, 1,6-hexanediol, 1,4-dimethylolcyclohexane, 2,2-[bis(4-hydroxycyclohexyl)]propane, diethylene glycol, dipropylene glycol, glycerol, pentaerythritol, etc. Preferably the polyol component has a high proportion of neopentyl glycol in order to achieve the highest possible glass transition temperature.

Preferred multibasic carboxylic acids are terephthalic acid, isophthalic acid, trimellitic acid, adipic acid and/or 1,4-cyclohane dicarboxylic acid. The functionality of the preferred carboxylate-group-containing polyester resins is adjusted by means of the ratio of dibasic and higher than dibasic carboxylic acids.

Suitable carboxylate-group-containing acrylate polymers have an acid number of 10-350 mg KOH/g, preferably 20 to 300 mg KOH/g and a glass transition temperature $T_g$ above 40° C., preferably from 45 to 100° C., produced by homopolymerization or copolymerization of a monomer mixture.

The polyacrylate contains carboxylic acid groups and may be a homopolymer or a copolymer.

Usable monomers are acrylic acid and/or methacrylic acid, $C_1$-$C_{40}$ alkyl esters and/or cycloalkyl esters of methacrylic acid and/or acrylic acid, hydroxyalkyl acrylates and/or hydroxyalkyl methacrylates, glycidyl methacrylate, glycidyl acrylate, 1,2-epoxybutyl acrylate, 1,2-epoxybutyl methacrylate, 2,3-epoxycyclopentyl acrylate, 2,3-epoxycyclopentyl methacrylate as well as the analogous amides, while styrene and/or its derivatives may also be present.

Preferably there are used butyl acrylate and/or butyl methacrylate, 2-hydroxyethyl acrylate and/or 2-hydroxyethyl methacrylate, methyl methacrylate, styrene, (meth)acrylic acid and possibly further unsaturated monomers, at least one carboxylate-group-containing monomer being used.

Further suitable monomers are (cyclo)alkyl esters of acrylic or methacrylic acid having 2 to 18 carbon atoms in the (cyclo)alkyl radical. Examples of suitable or preferably suitable monomers are ethyl (meth)acrylate, n-propyl(meth) acrylate, isopropyl(meth)acrylate, n-butyl (meth)acrylate, isobutyl (meth)acrylate, tert-butyl (meth)acrylate, 2-ethylhexyl(meth)acrylate, cyclohexyl methacrylate, neopentyl methacrylate, isobornyl methacrylate, 3,3,5-trimethylcyclohexyl methacrylate and stearyl methacrylate.

Examples of monomers in this regard are styrene, vinyltoluene and ethylstyrene. Examples of are acrylic and methacrylic acids, which are also preferably used, as well as crotonic acid, itaconic acid, fumaric acid maleic acid and citaconic acid, The polyacrylate preferably has an OH number smaller than 10 mg KOH/g, an acid number of 5 to 350 mg KOH/g, preferably 20 to 300 mg KOH/g, particularly preferably 30 to 250 mg KOH/g, a $T_g$ of 40 to 110° C., preferably 45 to 100° C., an $M_w$ of 500 to 50,000 g/mol, preferably 1,000 to 30,000 g/mol, particularly preferably 1,500 to 20,000 g/mol.

Epoxy resins may also be used as co-cross-linking agents. Examples in this regard are glycidyl ethers and glycidyl esters, aliphatic epoxides, diglycidyl ethers based on bisphenol A and glycidyl methacrylates. Examples of such epoxides are triglycidyl isocyanurate (examples of TGIC trade names are ARALDITE PT 810, Huntsman; TEPIC G, Nissan; Taida TGIC, Anhui Taida), mixtures of terephthalic acid diglycidyl esters and trimellitic acid triglycidyl esters (examples of trade names are ARALDITE PT 910 and PT 912, Huntsman), glycidyl esters of versatic acid (example of trade name is CARDURA E10, Shell), 3,4-epoxycyclohexylmethyl-3',4'-epoxycyclohexane carboxylate (ECC), diglycidyl ethers based on bisphenol A (example of trade name is EPIKOTE 828, Shell), ethylhexyl glycidyl ethers, butyl glycidyl ethers, pentaerythritol tetraglycidyl ethers (example of trade name is POLYPDX R 16, UPPC AG) as well as other polypox types containing free epoxy groups. Mixtures may also be used. Preferably TEPIC G or ARALDITE PT 910 and 912 are used. Such co-cross-linking agents may be employed in proportions of up to 50 wt % of the curing-agent mixture being used in the form of inventive (β-hydroxyalkylamide (matte curing agents) and co-cross-linking agents.

Surprisingly, it has been found that p-hydroxyalkylamides having a cyclohexane ring in the skeleton, with the proviso that the p-hydroxyalkylamides exist in solid form below 150° C., lead to matte surfaces after curing when used as cross-linking agents for carboxyl-group-containing polymers in powder lacquers.

The p-hydroxyalkylamides B) can be produced from various starting materials. A known method is the reaction of p-hydroxyalkylamines with esters of carboxylic acids, the latter generating the basic skeleton (A). Depending on the choice of starting materials, the inventive β-hydroxyalkylamides can be produced in this way.

Alternative but less preferred methods are based on other carboxylic acid derivatives, such as carboxylic acids, carboxylic acid chlorides, carboxylic acid anhydrides or other activated carboxylic acid derivatives as starting materials, which are reacted with β-hydroxyalkylamines. Suitable β-hydroxyalkylamines are such containing alkyl groups having at least 2 to 10 carbon atoms in the hydrocarbon skeleton. The alkyl groups may be linear, branched or even cyclic. Likewise, the alkyl groups may be substituted with hetero atoms, preferably oxygen and nitrogen. Furthermore, these alkyl groups may also contain functional groups, preferably carbonyl groups, carboxyl groups, amino groups, amide groups and urethane groups, and may have an additional alkyl radical on the nitrogen.

In this invention the β-hydroxyalkylamides are preferably produced from N-alkyl-1,2-alkanolamines and/or from N,N-bis-2-hydroxyalkylamines and esters of cyclohexanedicarboxylic acids.

Particularly preferably, there are used β-hydroxyalkylamines of formulas II and/or III:

Formulas II

Formulas II

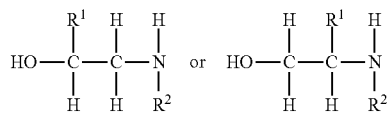

where
$R^1$ denotes hydrogen, methyl, ethyl, propyl,
$R^2$ denotes methyl;

Formulas III

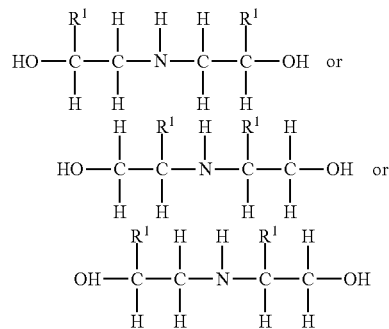

where $R^1$ denotes hydrogen, methyl, ethyl, propyl, either simultaneously or independently of one another.

According to the invention, the following compounds are used particularly preferably as starting materials for production of the β-hydroxyalkylamides: diethanolamine (DEA), diisopropanolamine (DTPA), di-sec-butanolamine, N-methylethanolamine, N-methyl-isopropanolamine.

1,2-, 1,3- and 1,4-Cyclohexanedicarboxylic acid derivatives, especially cyclohexanedicarboxylic acid dialkyl esters, are suitable as starting compounds for substituents A in the inventive β-hydroxyalkylamides. These starting compounds may have any desired cis/trans content.

Preferably there are used compounds of formula IV,

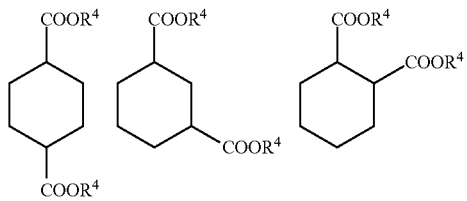

where $R^4$ denotes methyl, ethyl, propyl, butyl simultaneously or independently of one another.

Particularly preferably there are used 1,4-substituted cyclohexanedicarboxylic acid esters, most particularly preferably dimethyl-1,4-cyclohexyl dicarboxylate.

Those β-hydroxyalkylamides of dialkyl-1,4-cyclohexyldicarboxylates, preferably of dimethyl-1,4-cyclohexyldicarboxylate, which are particularly preferred according to the invention have a trans content, relative to the position of the carboxyl groups on the cyclohexyl ring, of greater than or equal to 70 mol %, preferably greater than 80 mol % and particularly preferably greater than 85 mol %. In this connection, dialkyl-1,4-cyclohexyldicarboxylates having any desired trans content may be used for production of the preferred β-hydroxyalkylamides.

The inventive p-hydroxyalkylamides (I) exist in solid form below 150° C., preferably below 170° C., particularly preferably below 180° C.

Particularly preferred inventive β-hydroxyalkylamides have the following formulas:

Formula V

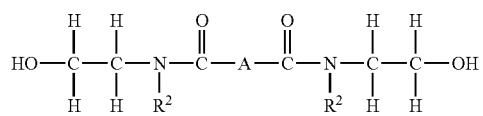

Formula VI

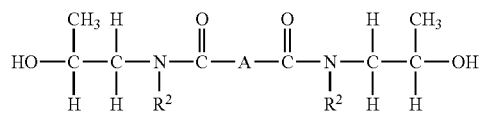

Formula VII

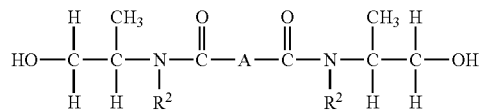

Formula VIII

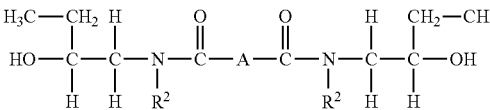

Formula IX

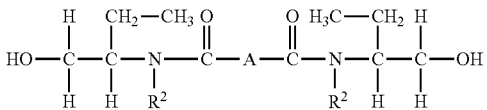

Formula X

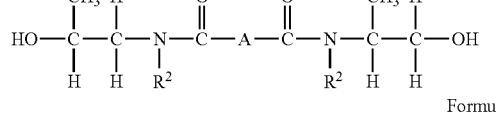

Formula XI

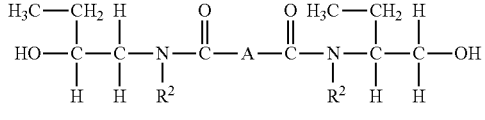

where
$R^2$: methyl,
or

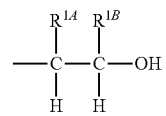

where $R^{1A}$ denotes hydrogen and $R^{1B}$ denotes methyl, ethyl, propyl,
or
where $R^{1A}$ denotes methyl, ethyl, propyl and $R^{1B}$ denotes hydrogen;

and
A: 1,4-disubstituted cyclohexane ring of the formula

wherein the trans content of A is z 70 mol %;
and wherein the β-hydroxyalkylamides exist in solid form below 150° C.

That β-hydroxyalkylamide of dimethyl-1,4-cyclohexyldicarboxylate and diethanolamine which is particularly preferred according to the invention and has four β-hydroxyalkylamide groups per molecule according to formula XII Formula XII

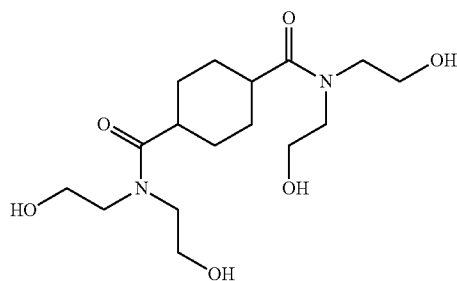

has a trans content on the cyclohexyl ring of greater than or equal to 70 mol %, preferably greater than 80 mol % and particularly preferably greater than 85 mol %.

To achieve good lacquer-specific properties of the powder-lacquer composition, the ratio of β-hydroxyalkylamide groups to the carboxylate groups of the carboxylate-group-containing polymers preferably ranges between 0.1 and 1.5:1, particularly preferably between 0.8 and 1.2:1.

Processing aids and additives C) that are customary in powder-lacquer technology, such as leveling agents, for example polysilicones or acrylates, light stabilizers, for example sterically hindered amines and/or absorbers, degassing agents (for example benzophenone), modified phenol resins, catalysts and/or other auxiliary materials, such as described, for example, in EP 669353, may be added to the powder-lacquer composition in a total proportion of 0.1 to 10 wt %. Fillers and pigments such as titanium dioxide may be added in a proportion of up to 50 wt % of the total composition.

The powder-lacquer compositions contain the following components in the weight proportions shown:

|  | Wt % |
|---|---|
| Inventive β-hydroxyalkylamide (matte curing agent) B) | 0.5 to 20 |
| preferably | 1 to 15 |
| Optional HAA curing agent | 0 to 10 |
| preferably | 0 to 8 |
| Carboxylate-group-containing polymers A) | 35 to 96 |
| preferably | 50 to 80 |
| Optional co-cross-linking agents | 0 to 5 |
| preferably | 0 to 3 |
| Additives, fillers, pigments, etc. C) | 0.1 to 50 |
| preferably | 5 to 40 |

In the storage test according to DIN EN ISO 8130-8, which is standard for powder lacquers, the inventive powder-lacquer compositions exhibit good storage stability at temperatures of 30±1 and 40±1° C. and can be stored for >30 days.

In the particularly preferred embodiment of the invention, the inventive powder-lacquer compositions contain the following components:

At least one carboxylate-group-containing polyester having an acid number of 15 to 150 mg KOH/g and a glass transition temperature of at least 40° C., At least one inventive β-hydroxyalkylamide having at least two or more, preferably four β-hydroxyalkylamide groups, or else mixtures thereof with the same and/or different functionality, And, if necessary, further additives and processing aids customary for powder lacquers, such as wetting, leveling or degassing agents, heat or UV stabilizers, pigments, dyes, fillers, co-cross-linking agents.

Subject matter of the invention is a method for production of a powder-lacquer composition substantially containing A) at least one carboxylate-group-containing polymer having an acid number of 5 to 250 mg KOH/g and a glass transition temperature $T_g$ higher than 40° C., and B) at least one β-hydroxyalkylamide having two or three or four β-hydroxyalkylamide groups per molecule of formula I

I

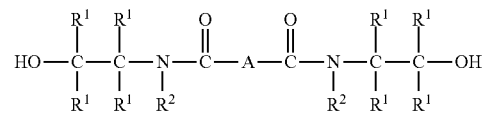

where
$R^1$, $R^2$: independently of one another denote the same or different radicals, selected from alkyl radicals, cycloalkyl radicals, aryl radicals, aralkyl radicals or alkenyl radicals having 1-24 carbon atoms, wherein the radicals may also contain heteroatoms and/or functional groups and wherein $R^1$ may also be hydrogen
and wherein $R^2$ may also be

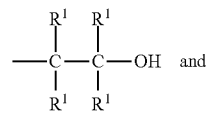

A:

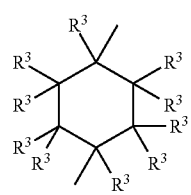

$A^1$

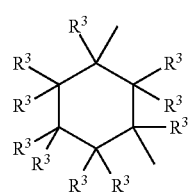

$A^2$

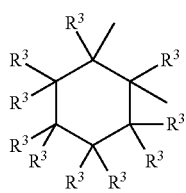

where $R^3$: independently of one another denote the same or different radicals, selected from hydrogen, alkyl radicals, cycloalkyl radicals, aryl radicals, aralkyl radicals or alkenyl radicals having 1-24 carbon atoms, wherein the radicals may also contain heteroatoms and/or functional groups and wherein two or more $R^3$ substituents may be linked to one another to form rings;

wherein the β-hydroxyalkylamides exist in solid form below 150° C.;

C) optional processing aids and/or additives;

wherein the ratio of β-hydroxyalkyamide groups to the carboxylate groups ranges between 0.5:1 and 1.5:1;

in the molten state by coextrusion of all components at temperatures between 80 and 150° C.

The inventive powder-lacquer compositions are more preferably produced in the molten state by coextrusion of all components A) to C) at temperatures between 80 and 150° C. The extrudate is then cooled, ground and sieved or classified to a grain size of <120 μm, preferably <100 μm.

The thermally curable and toxicologically safe powder-lacquer composition produced according to the invention therefore comprises a matrix obtained by coextrusion of all components.

To achieve the inventive effect, namely the formation of matte surfaces with a specular gloss according to DIN 67530/ISO 2813 of <50 at an angle of incidence of 60°, it is possible to use numerous carboxylate-group-containing polymers, especially carboxyl-group-terminated polyesters or polyacrylates, which differ in functionality and reactivity. Via the chosen binder partners (polyesters) in conjunction with the inventive hydroxyalkylamides, therefore, the desired gloss may be selected within a considerable bandwidth (Examples: 1-7) in otherwise the same formulation. Example (8) containing polyacrylate differs therefrom, since more cross-linking agent is needed for the higher acid number and less pigmentation was chosen in view of the expected greater brittleness.

The powder lacquers for producing coatings are used and applied by methods standard for powder lacquers, preferably by means of an electrostatic powder-lacquer spraying machine using the triboelectric or corona method or the fluidized-bed method.

At normal ambient temperatures, the powder-lacquer compositions produced according to the invention have good storage stability and, after cross-linking between 150 and 220° C., exhibit good lacquer-specific properties, optically well flowing surfaces and the described low specular gloss.

In contrast to the prior art, the inventive powder-lacquer compositions yield coatings with optically very beautiful, well flowing surfaces (PCI Rating Tables 8-10), which are nevertheless matte (10-30 units) and/or semi-matte (30-50 units), measured as reflectometer values according to DIN 67530/ISO 2813 at an angle of incidence of 60°, without the need for either a dry mixture (dry blend) or a polyester mixture or a polyacrylate mixture (one-shot blend).

Above and beyond this variation, the possibility additionally exists that the reflectometer value, measured according to DIN 67530/ISO 2813 at an angle of incidence of 60°, could be shifted to higher values until high gloss in excess of 80 scale divisions at an angle of 60° is restored.

This is achieved by partial replacement of the inventive matte curing agent B) by a commercially available p-hydroxyalkylamide having two or more than two p-hydroxyalkylamide groups or mixtures thereof having different functionalities.

Subject matter of the invention is the use of a powder-lacquer composition substantially containing A) at least one carboxylate-group-containing polymer having an acid number of 5 to 350 mg KOH/g and a glass transition temperature $T_g$ higher than 40° C., and B) at least one β-hydroxyalkylamide having two or three or four β-hydroxyalkylamide groups per molecule of formula I

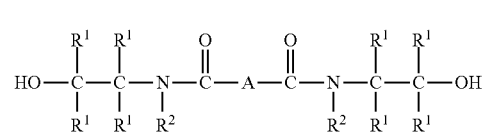

where $R^1$, $R^2$: independently of one another denote the same or different radicals, selected from alkyl radicals, cycloalkyl radicals, aryl radicals, aralkyl radicals or alkenyl radicals having 1-24 carbon atoms, wherein the radicals may also contain heteroatoms and/or functional groups and wherein $R^1$ may also be hydrogen and wherein $R^2$ may also be

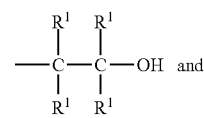

A:

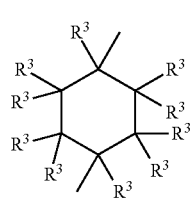

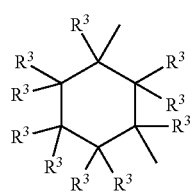

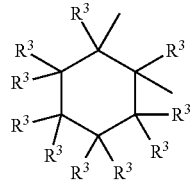

where $R^3$: independently of one another denote the same or different radicals, selected from hydrogen, alkyl radicals, cycloalkyl radicals, aryl radicals, aralkyl radicals or alkenyl radicals having 1-24 carbon atoms, wherein the radicals may also contain heteroatoms and/or functional groups and wherein two or more $R^3$ substituents may be linked to one another to form rings;
wherein the fβ-hydroxyalkylamides exist in solid form below 150° C.;

C) optional processing aids and/or additives;
wherein the ratio of p-hydroxyalkyamide groups to the carboxylate groups ranges between 0.5:1 and 1.5:1,
for the production of coatings having matte surfaces, with a specular gloss according to DIN 67530/ISO 2813 of <50 at an angle of incidence of 60.

EXAMPLES

The following examples and Tables 1, 2 and 3 characterize the compositions of the coating system and the properties of the respective coating after it has been applied and cured.

Starting Materials

1) β-Hydroxyalkylamide
  a) β-Hydroxyalkylamide (matte curing agent) based on 1,4-cyclohexanedicarboxylic acid and diethanolamine having four β-hydroxyalkylamide groups per molecule as in Formula XII has a trans content on the cyclohexyl ring of >90% (Evonik Degussa GmbH, Germany).

| | | |
|---|---|---|
| Trans-N,N,N',N'-tetrakis-(2-hydroxyethyl)cyclohexyl-1,4-diamide[1] | Mass % | 95.30 |
| Cis-N,N,N',N'-tetrakis-(2-hydroxyethyl)cyclohexyl-1,4-diamide[1] | Mass % | 0.28 |
| Σ N,N,N',N'-tetrakis-(2-hydroxyethyl)cyclohexyl-1,4-diamide[1] | Mass % | 95.58 |
| DEA[1] | Mass % | 0.18 |
| OH number | mg KOH/g | 616 |
| Base number | mg KOH/g | 3 |
| Melting range | ° C. | 194-201 |

[1]Analytical values by GC
OH number: DIN 53240
Base number: DIN 53176
Melting range: DIN EN ISO 3146 b) VESTAGON® HA 320, OH number: 660-740 mg KOH/g, melting range: 115-130° C. (Evonik Degussa GmbH, Germany)

2) Carboxylate-Group-Containing Polymer Resins a) Amorphous polyesters:

| | | | | |
|---|---|---|---|---|
| Crylcoat® 2617-3, | Acid number: 33 mg KOH/g, | Tg: 61° C., | (Cytec Inc., USA) | |
| Crylcoat® 2618-3, | Acid number: 35 mg KOH/g, | Tg: 61° C., | (Cytec Inc., USA) | |
| Crylcoat® E 36988, | Acid number: 30 mg KOH/g, | Tg: 54° C., | (Cytec Inc., USA) | |
| Uralac® P 800, | Acid number: 28 mg KOH/g, | Tg: 61° C., | (DSM Resins B.V., NL) | |
| Uralac® P 865, | Acid number: 35 mg KOH/g, | Tg: 56° C., | (DSM Resins B.V., NL) | |
| Pulverol® 8120, | Acid number: 33 mg KOH/g, | Tg: 60° C., | (Neochimiki LV s.a., GR) | |
| Pulverol® 8123, | Acid number: 33 mg KOH/g, | Tg: 60° C., | (Neochimiki LV s.a., GR) | | b) Polyarclate

| | | | |
|---|---|---|---|
| Joncryl® 819, | Acid number: 75 mg KOH/g, | Tg: 57° C., | (BASF AG, Germany) |

3) Co-Cross-Linking Agents
  a) Triglycidyl isocyanurate
    TEPIC®G, Epoxy equiv.: <110 g/Eq, Melting range: 90-125° C., (Nissan Chemical Ind. Ltd., Japan)
4) Further Formulation Components:
    Kronos 2160 titanium dioxide (Kronos Titan GmbH, Germany),
    Resiflow® PV 88 (Worlée-Chemie GmbH, Germany),
    Benzoin (Merck-Schuchard, Germany).

Powder Lacquer and Coating

The powder lacquer was produced firstly by mixing all components according to Tables 1 and 2 at room temperature in an MIT mixer at 500 rpm for 120 seconds and secondly by coextruding the molten mixture at a temperature (housing) of 90° C. (charge temperature approximately 130° C.). The stoichiometric ratio of acid groups of the polyester or polyacrylate to OH groups of the β-hydroxyalkyamides (curing agent) was approximately 1:1. When co-cross-linking agents were used, they were considered to be a stoichiometric part of the curing agent.

The extrudate was then cooled, ground and sieved to a grain size of <100 μm. The powder lacquer produced in this way was applied with an electrostatic powder-spraying machine at 60 kV onto degreased steel sheets (deep-drawn steel of the Kruppel Co., 210×70×0.8 mm) and/or aluminum sheets (Q-panel AL-36 5005 H 14/08 0.8 mm) and baked between 160 and 220° C. in a circulating-air drying oven. The cured lacquer films exhibited a layer thickness of approximately 55 to 65 μm. The data in the examples relate to a baking time of 20 minutes at 200° C.

TABLE 1

Test after the behavior with various polyesters and polyacrylate
Examples of formulation with inventive β-hydroxyalkylamide 1a
(matte curing agent) and various resins

| | | Example | | | | | | | |
|---|---|---|---|---|---|---|---|---|---|
| | | 1 | 2 | 3 | 4 | 5 | 6 | 7 | 8 |
| β-Hydroxyalkylamide 1a | wt % | 3.00 | 3.00 | 3.00 | 3.00 | 3.00 | 3.00 | 3.00 | 7.80 |
| CRYLCOAT ® 2618-3 | wt % | 60.70 | — | — | — | — | — | — | — |
| CRYLCOAT ® E 36988 | wt % | — | 60.70 | — | — | — | — | — | — |
| PULVEROL ® 8120 | wt % | — | — | 60.70 | — | — | — | — | — |

TABLE 1-continued

Test after the behavior with various polyesters and polyacrylate
Examples of formulation with inventive β-hydroxyalkylamide 1a
(matte curing agent) and various resins

| | | Example | | | | | | | |
|---|---|---|---|---|---|---|---|---|---|
| | | 1 | 2 | 3 | 4 | 5 | 6 | 7 | 8 |
| URALAC ® P 800 | wt % | — | — | — | 60.70 | — | — | — | — |
| URALAC ® P 865 | wt % | — | — | — | — | 60.70 | — | — | — |
| CRYLCOAT ® 2617-3 | wt % | — | — | — | — | — | 60.70 | — | — |
| PULVEROL ® 8123 | wt % | — | — | — | — | — | — | 60.70 | — |
| JONCRYL ® SCX 819 | wt % | — | — | — | — | — | — | — | 66.00 |
| KRONOS ® 2160 | wt % | 35.00 | 35.00 | 35.00 | 35.00 | 35.00 | 35.00 | 35.00 | 25.00 |
| RESIFLOW ® PV 88 | wt % | 1.00 | 1.00 | 1.00 | 1.00 | 1.00 | 1.00 | 1.00 | 1.00 |
| Benzoin | wt % | 0.30 | 0.30 | 0.30 | 0.30 | 0.30 | 0.30 | 0.30 | 0.20 |
| Curing at 200° C. | min | 20 | 20 | 20 | 20 | 20 | 20 | 20 | 30 |
| Layer thickness | μm | 67-71 | 57-66 | 57-59 | 57-61 | 66-73 | 54-60 | 52-59 | 58-62 |
| Erichsen indentation | mm | >8 | 4 | >8 | 5 | >8 | >8 | >8 | 6 |
| Direct ball impact | in lb | >80 | >80 | >80 | >80 | >80 | >80 | >80 | 20 |
| Reverse ball impact | in lb | 60 | 60 | 80 | 50 | 80 | 60 | 80 | <10 |
| Gloss at 60° incidence | units | 36 | 53 | 44 | 51 | 30 | 33 | 45 | 33 |
| Gloss at 80° incidence | units | 44-48 | 62-67 | 53-59 | 60-64 | 39-43 | 41-43 | 55-61 | 59-65 |

By replacing the inventive β-hydroxyalkylamide 1a) with a commercially available β-hydroxyalkylamide such as VESTAGON HA 320 1 b), or even by mixing with other commercial products of the same and/or different functionality, it is possible to maintain the gloss in the case of lower admixtures or, if desired, to shift it to higher values by increasing or replacing the additive. This is illustrated here for a polyester in Examples 9 to 13.

Examples of formulation with inventive β-hydroxyalkylamide 1a (matte curing agent) and various resins and with commercial β-hydroxyalkylamide 1b)

TABLE 2

| | | Example | | | | |
|---|---|---|---|---|---|---|
| | | 9 | 10 | 11 | 12 | 13 |
| β-Hydroxyalkylamide 1a | wt % | 1.90 | 1.75 | 1.50 | 1.00 | 0.25 |
| VERTAGON HA 320 1b | wt % | 1.10 | 1.25 | 1.50 | 2.00 | 2.75 |
| CRYLCOAT ® 2617-3 | wt % | 60.70 | 60.70 | 60.70 | 60.70 | 60.70 |
| KRONOS ® 2160 | wt % | 35.00 | 35.00 | 35.00 | 35.00 | 35.00 |
| RESIFLOW ® PV 88 | wt % | 1.00 | 1.00 | 1.00 | 1.00 | 1.00 |
| Benzoin | wt % | 0.30 | 0.30 | 0.30 | 0.30 | 0.30 |
| Curing at 200° C. | min | 20 | 20 | 20 | 20 | 20 |
| Layer thickness | μm | 57-66 | 57-59 | 57-61 | 66-73 | 54-60 |
| Erichsen indentation | mm | >8 | >8 | >8 | >8 | >8 |
| Direct ball impact | in lb | >80 | >80 | >80 | >80 | >80 |
| Reverse ball impact | in lb | 80 | >80 | >80 | >80 | >80 |
| Gloss at 60° incidence | units | 53 | 57 | 62 | 83 | 94 |

Epoxy resins may also be used as co-cross-linking agents. Examples in this regard are glycidyl ethers and glycidyl esters, aliphatic epoxides, diglycidyl ethers based on bisphenol A and glycidyl methacrylates. Examples of such epoxides are triglycidyl isocyanurate (examples of TGIC trade names are ARALDITE PT 810, Huntsman; TEPIC G, Nissan; Taida TGIC, Anhui Taida), mixtures of terephthalic acid diglycidyl esters and trimellitic acid triglycidyl esters (examples of trade names are ARALDITE PT 910 and PT 912, Huntsman), glycidyl esters of versatic acid (example of trade name is CARDURA E10, Shell), 3,4-epoxycyclohexylmethyl-3',4'-epoxycyclohexane carboxylate (ECC), diglycidyl ethers based on bisphenol A (example of trade name is EPIKOTE 828, Shell), ethylhexyl glycidyl ethers, butyl glycidyl ethers, pentaerythritol tetraglycidyl ethers (example of trade name is POLYPDX R 16, UPPC AG) as well as other polypox types containing free epoxy groups. Mixtures may also be used. Preferably TEPIC G or ARALDITE PT 910 and 912 are used. Such co-cross-linking agents may be employed in proportions of up to 50 wt % of the curing-agent mixture being used in the form of matte curing agents and co-cross-linking agents.

Examples of formulation with inventive β-hydroxyalkylamide 1a (matte curing agent) and co-cross-linking agents

TABLE 3

| | | Example | | | |
|---|---|---|---|---|---|
| | | 14 | 15 | 16 | 17 |
| β-Hydroxyalkylamide 1a | wt % | 2.95 | 2.90 | 2.80 | 2.50 |
| TEPIC G 3a | wt % | 0.05 | 0.10 | 0.20 | 0.50 |
| CRYLCOAT ® 2617-3 | wt % | 60.70 | 60.70 | 60.70 | 60.70 |
| KRONOS ® 2160 | wt % | 35.00 | 35.00 | 35.00 | 35.00 |
| RESIFLOW ® PV 88 | wt % | 1.00 | 1.00 | 1.00 | 1.00 |
| Benzoin | wt % | 0.30 | 0.30 | 0.30 | 0.30 |
| Curing at 200° C. | min | 20 | 20 | 20 | 20 |
| Layer thickness | μm | 50-56 | 50-55 | 53-62 | 45-51 |
| Erichsen indentation | mm | >8 | >8 | >8 | >8 |
| Direct ball impact | in lb | >60 | >80 | >80 | >80 |
| Reverse ball impact | in lb | <10 | >80 | >80 | >80 |
| Gloss at 60° incidence | units | 32 | 44 | 45 | 53 |
| Gloss at 85° incidence | units | 40-45 | 58-62 | 57-59 | 65-67 |

The invention claimed is:
1. A powder-lacquer composition, comprising:
A) at least one carboxylate-group-containing polymer having an acid number of 5 to 250 mg KOH/g and a glass transition temperature $T_g$ higher than 40° C.,

B) at least one β-hydroxyalkylamide having two or three or four β-hydroxyalkylamide groups per molecule and having one of the following formulas:

Formula V
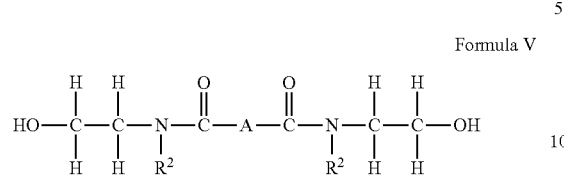

Formula VI
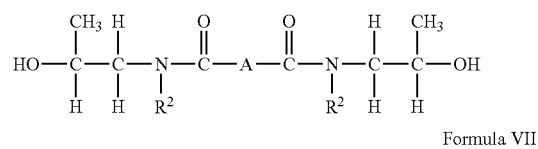

Formula VII
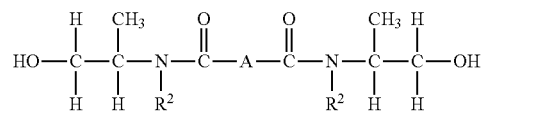

Formula VIII
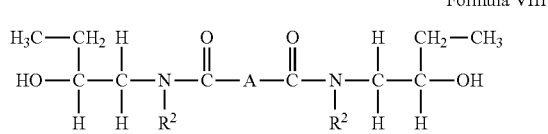

Formula IX
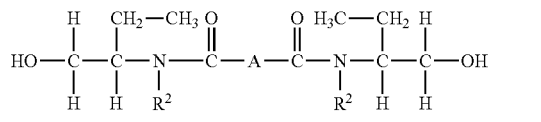

Formula X
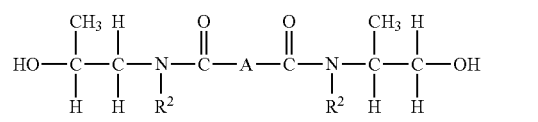

Formula XI
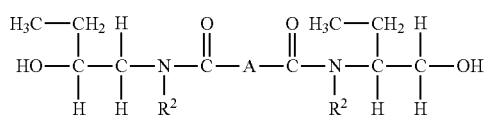

where
$R^2$: methyl,
or

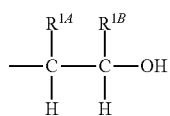

where $R^{1A}$ denotes hydrogen and $R^{1B}$ denotes methyl, ethyl, propyl,
or
where $R^{1A}$ denotes methyl, ethyl, propyl and $R^{1B}$ denotes hydrogen; and
A: 1,4-disubstituted cyclohexane ring of the formula

wherein the trans content of A is ≥70 mol %;
and wherein the β-hydroxyalkylamides exist in solid form below 150° C.; and
C) optionally, at least one processing aid and/or additive; wherein the ratio of β-hydroxyalkylamide groups to the carboxylate groups ranges between 0.5:1 and 1.5:1.

2. The powder-lacquer composition according to claim 1, wherein the trans content of A is ≥80 mol %.

3. The powder-lacquer composition according to claim 1, wherein the trans content of A is ≥85 mol %.

4. The powder-lacquer composition according to claim 1, wherein the O-hydroxyalkylamide is obtained from a dialkyl-1,4-cyclohexyldicarboxylate.

5. The powder-lacquer composition according to claim 4, wherein the trans content of A is ≥80 mol %.

6. The powder-lacquer composition according to claim 4, wherein the trans content of A is ≥85 mol %.

7. A powder-lacquer composition, comprising:
A) at least one carboxylate-group-containing polymer having an acid number of 5 to 250 mg KOH/g and a glass transition temperature $T_g$ higher than 40° C.,
B) a β-hydroxyalkylamide having the formula XII:

Formula XII
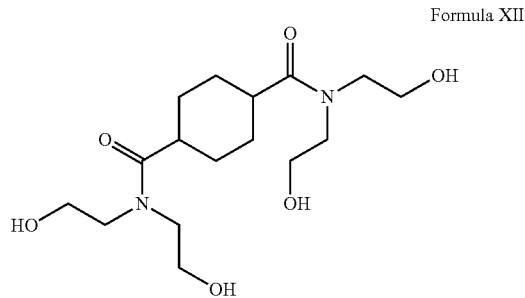

with a trans content on the cyclohexyl ring of greater than or equal to 70 mol %; and
C) optionally, at least one processing aid and/or additive; wherein the ratio of β-hydroxyalkylamide groups to the carboxylate groups ranges between 0.5:1 and 1.5:1.

8. The powder-lacquer composition according to claim 7, wherein the trans content on the cyclohexyl ring is ≥80 mol %.

9. The powder-lacquer composition according to claim 7, wherein the trans content on the cyclohexyl ring is ≥85 mol %.

10. The powder-lacquer composition according to claim 1, wherein the β-hydroxyalkylamide exists in solid form below 170° C.

11. The powder-lacquer composition according to claim 1, wherein the β-hydroxyalkylamide exists in solid form below 180° C.

12. The powder-lacquer composition according to claim 7, wherein the at least one carboxylate-group-containing polymer A) is a polyester having a glass transition temperature $T_g$ ranging from 40 to 80° C.; an acid number varying from 10 to 150 mg KOH/g; an OH number smaller than 15 mg KOH/g; and an average molecular weight $M_w$ of 1,000 to 10,000 g/mol.

13. The powder-lacquer composition according to claim 12, wherein the at least one carboxylate-group-containing polymer A) has a glass transition temperature $T_g$ ranging from 40 to 70° C.; an acid number varying from 12 to 120 mg KOH/g; and an average molecular weight $M_w$ of 1,500 to 9,000 g/mol.

14. The powder-lacquer composition according to claim 13, wherein the at least one carboxylate-group-containing polymer A) has an average molecular weight $M_w$ of 2,000 to 8,000 g/mol.

15. The powder-lacquer composition according to claim 7, wherein the at least one carboxylate-group-containing polymer A) is an acrylic polymer having an OH number smaller than 10 mg KOH/g; an acid number of 10 to 350 mg KOH/g; a $T_g$ of 40 to 110° C.; and an $M_w$ of 500 to 50,000 g/mol.

16. The powder-lacquer composition according to claim 15, wherein the at least one carboxylate-group-containing polymer A) is an acrylic polymer having an acid number of 20 to 300 mg KOH/g; a $T_g$ of 45 to 100° C.; and an $M_w$ of 1,000 to 30,000.

17. The powder-lacquer composition according to claim 16, wherein the at least one carboxylate-group-containing polymer A) is an acrylic polymer having an acid number of 30 to 250 mg KOH/g; and an $M_w$ of 1,500 to 20,000 g/mol.

18. The powder-lacquer composition according to claim 1, wherein the at least one carboxylate-group-containing polymer A) is a polyester having a glass transition temperature $T_g$ ranging from 40 to 80° C.; an acid number varying from 10 to 150 mg KOH/g; an OH number smaller than 15 mg KOH/g; and an average molecular weight $M_w$ of 1,000 to 10,000 g/mol.

19. The powder-lacquer composition according to claim 18, wherein the at least one carboxylate-group-containing polymer A) has a glass transition temperature $T_g$ ranging from 40 to 70° C.; an acid number varying from 12 to 120 mg KOH/g; and an average molecular weight $M_w$ of 1,500 to 9,000 g/mol.

20. The powder-lacquer composition according to claim 19, wherein the at least one carboxylate-group-containing polymer A) has an average molecular weight $M_w$ of 2,000 to 8,000 g/mol.

21. The powder-lacquer composition according to claim 1, wherein the at least one carboxylate-group-containing polymer A) is an acrylic polymer having an OH number smaller than 10 mg KOH/g; an acid number of 10 to 350 mg KOH/g; a $T_g$ of 40 to 110° C.; and an $M_w$ of 500 to 50,000 g/mol.

22. The powder-lacquer composition according to claim 21, wherein the at least one carboxylate-group-containing polymer A) is an acrylic polymer having an acid number of 20 to 300 mg KOH/g; a $T_g$ of 45 to 100° C.; and an $M_w$ of 1,000 to 30,000.

23. The powder-lacquer composition according to claim 22, wherein the at least one carboxylate-group-containing polymer A) is an acrylic polymer having an acid number of 30 to 250 mg KOH/g; and an $M_w$ of 1,500 to 20,000 g/mol.

24. The powder-lacquer composition according to claim 1, which contains a least one co-cross-linking agent based on an epoxy resin and/or a β-hydroxyalkylamide different from B).

25. A method for production of a powder-lacquer composition comprising coextruding in the molten state a composition comprising the following components at a temperature between 80 and 150° C.:

A) at least one carboxylate-group-containing polymer having an acid number of 10 to 250 mg KOH/g and a glass transition temperature $T_g$ higher than 40° C., B) at least one β-hydroxyalkylamide having two or three or four 3-hydroxyalkylamide groups per molecule of formula I

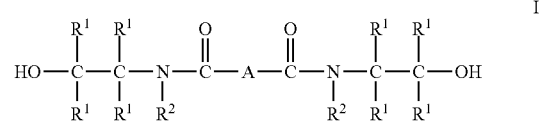

where
R¹, R²: independently of one another denote the same or different radicals, selected from alkyl radicals, cycloalkyl radicals, aryl radicals, aralkyl radicals or alkenyl radicals having 1-24 carbon atoms, wherein the radicals may also contain heteroatoms and/or functional groups and wherein R¹ may also be hydrogen,
and wherein R² may also be

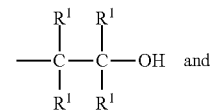

A:

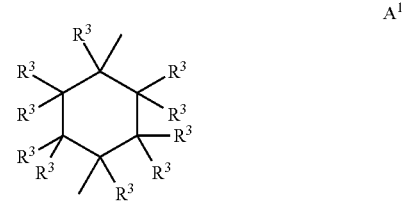

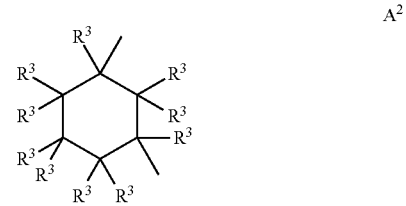

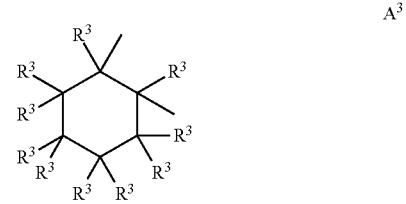

where R³: independently of one another denote the same or different radicals, selected from hydrogen, alkyl radicals, cycloalkyl radicals, aryl radicals, aralkyl radicals or alkenyl radicals having 1-24 carbon atoms, wherein the radicals may also contain heteroatoms and/or functional groups and wherein two or more R³ substituents may be linked to one another to form rings;
wherein the β-hydroxyalkylamides exist in solid form below 150° C.;
C) optionally, at least one processing aid and/or additive;
wherein the ratio of β-hydroxyalkylamide groups to the carboxylate groups ranges between 0.5:1 and 1.5:1.

26. A process comprising coating the powder-lacquer composition according to claim 1 on a substrate, wherein the coating has a matte surface, with a specular gloss according to DIN 67530/ISO 2813 of <50 at an angle of incidence of 60.

* * * * *